(12) United States Patent
van Steijn

(10) Patent No.: US 11,457,638 B2
(45) Date of Patent: Oct. 4, 2022

(54) METHOD FOR HANGING POULTRY OR PARTS THEREOF ON AN OVERHEAD CONVEYOR, A SYSTEM AND AN APPARATUS

(71) Applicant: Meyn Food Processing Technology B.V., Oostzaan (NL)

(72) Inventor: Aloysius Christianus Maria van Steijn, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 17/319,165

(22) Filed: May 13, 2021

(65) Prior Publication Data

US 2021/0368811 A1 Dec. 2, 2021

(30) Foreign Application Priority Data

May 26, 2020 (NL) ..................................... 2025670

(51) Int. Cl.
*A22C 21/00* (2006.01)
*A22B 7/00* (2006.01)

(52) U.S. Cl.
CPC .......... *A22C 21/0053* (2013.01); *A22B 7/002* (2013.01); *A22B 7/004* (2013.01)

(58) Field of Classification Search
CPC ...... A22C 21/0053; A22B 7/002; A22B 7/004
USPC ......................................... 452/177, 182–184
See application file for complete search history.

(56) References Cited

U.S. PATENT DOCUMENTS

| 4,090,275 | A | | 5/1978 | Jorgensen et al. |
| 5,474,493 | A | * | 12/1995 | Tolbert ............... B65G 47/1457 452/179 |
| 6,473,287 | B1 | * | 10/2002 | Van Ochten ............. A22B 3/06 361/232 |
| 7,856,842 | B2 | * | 12/2010 | Van Stuyvenberg .. A23B 4/062 62/380 |
| 9,907,314 | B2 | * | 3/2018 | Janssen .................. A22C 21/00 |
| 11,178,882 | B2 | * | 11/2021 | Pavan ................ A22C 21/0046 |

FOREIGN PATENT DOCUMENTS

| EP | 0 487 075 A1 | 5/1992 |
| WO | WO 00/41568 A2 | 7/2000 |

OTHER PUBLICATIONS

NL Search Report, dated Jul. 18, 2020.

* cited by examiner

*Primary Examiner* — Richard T Price, Jr.
(74) *Attorney, Agent, or Firm* — Dority & Manning, P.A.

(57) ABSTRACT

A method for hanging poultry in an overhead conveyor provided with carriers and can include an overhead-conveyor-section of the overhead conveyor and a first conveyor for conveying the poultry towards a section thereof being below the overhead-conveyor-section. The poultry can be conveyed by the first conveyor towards the section. An operator picks the poultry or parts thereof and hangs the poultry in the carriers being conveyed along the overhead-conveyor-section. The operator may be carried via a second conveyor beside the section of the first conveyor and in the direction of the carriers in the overhead-conveyor-section while the operator is picking and hanging the poultry.

15 Claims, 3 Drawing Sheets

METHOD FOR HANGING POULTRY OR PARTS THEREOF ON AN OVERHEAD CONVEYOR, A SYSTEM AND AN APPARATUS

PRIORITY STATEMENT

The present application claims priority under 35 U.S.C. § 119 to Dutch Application No. 2025670, filed May 26, 2020.

FIELD OF THE INVENTION

The subject matter of the present disclosure relates generally to hanging poultry or parts thereof in an overhead conveyor.

BACKGROUND OF THE INVENTION

Methods for hanging poultry in an overhead conveyor are known. For example, CO2-stunned poultry is to be hanged on the overhead conveyor fast enough to be slaughtered and processed. To facilitate hanging, the poultry may be conveyed via a first conveyor to a section thereof being at least below a section of the overhead conveyor. For the sake of clarity, the latter will be referred as the overhead-conveyor-section. Thus, the operator being beside the section of the first conveyor may therefore pick and hang the poultry in the carriers, e.g. shackles, when being conveyed along the overhead-conveyor-section with no need to walk to a different spot.

A "conveyor" is to be understood as mechanical apparatus arranged for moving items or people from one place to another via an endless movable element, such as an endless movable belt, chain, platform or the like, being driven by drive means.

A problem is that slaughterhouses may be expected to process poultry at high speeds, such as e.g., 15.000 birds per hour or even higher speeds. Thus, the speed of the carriers may be such that the operator has not enough time to hang poultry in all of them, and carriers of the overhead conveyor may be empty.

BRIEF DESCRIPTION OF THE INVENTION

Aspects and advantages of the invention will be set forth in part in the following description, or may be obvious from the description, or may be learned through practice of the invention.

In one exemplary aspect, an object of the present invention may include alleviating the aforementioned problem. To this end, an exemplary method of the invention may include a system having a second conveyor arranged for carrying the operator beside the section of the first conveyor and in the same direction as the carriers being conveyed along the overhead-conveyor-section. In this way, the speed of the carriers may be reduced relative to the operator being carried by the second conveyor.

In another exemplary aspect, the present invention relates to hanging poultry or parts thereof in an overhead conveyor provided with carriers for conveying the poultry or parts thereof while being hanged from the said carriers. A system may be used that includes an overhead-conveyor-section of the overhead conveyor and includes a first conveyor for conveying the poultry or parts thereof towards a section thereof arranged below the overhead-conveyor-section. The poultry or parts thereof may be conveyed via the first conveyor towards the section. An operator may pick the poultry or parts thereof in the carrier when the carriers are being conveyed along the overhead-conveyor-section.

In another exemplary aspect, the present invention may relate to a system that includes an overhead-conveyor-section of the overhead conveyor, and a first conveyor for conveying the poultry or parts thereof towards a section thereof arranged below the overhead-conveyor-section; The system may include a second conveyor below the first conveyor and arranged for carrying an operator beside the section of the first conveyor and in the same direction as the carriers in the overhead-conveyor-section. In this way, the operator may be carried below the overhead-conveyor-section and the system may help an operator to hang poultry or parts thereof in the carriers according to the method.

The second conveyor may be designed such that the operator is sitting down on a seat being conveyed by an endless chain. In a different embodiment, the second conveyor may include an endless movable belt or platform arranged below and beside the section of the first conveyor and on which the operator may stand up while being carried. In this way, picking and hanging is improved. A vertical distance between the first endless movable element at the section and the endless movable belt or platform of the second conveyor may be within a range between 60 cm and 100 cm.

In still another exemplary aspect, the second conveyor may be a carousel conveyor wherein the movable belt or platform for carrying the operator defines a substantially horizontal conveying loop such that the loop is arranged below the overhead-conveyor-section. In this way, the operator may be carried endlessly in the method. The loop may have an elliptical shape or O-shape. The overhead-conveyor-section may form an open loop arranged concentrically to the horizontal conveying loop relative a vertical axis, that is from a top view.

In still another exemplary aspect, the conveying speeds of the carrousel conveyor and the carriers in the overhead-conveyor-section may be arranged such that the carriers move forward relative to the operator being carried. In this way, the operator may be continuously provided with empty carriers as the filled carriers move further relative to the operator. For example, if the carrousel conveyor is arranged for carrying the operator at a speed V1 and the overhead-conveyor-section is concentric and the carriers are conveyed at a speed V2, the ratio V1/V2 may be below 1, may be between 0.4 and 1, may be between 0.6 and 1, or may be between 0.8 and 1.

The first conveyor may convey the poultry or parts thereof freely or contained in crates. It may be linear or may have a U-shape. The first conveyor may be arranged such that the section may convey in the same direction as the direction of the carriers along the overhead-conveyor-section. The first conveyor may be a further carousel conveyor and the poultry may be conveyed endlessly via an endless belt, platform or chain section or sections defining a substantially further horizontal conveying loop having an elliptical or O-shape. From a top view, the further carousel may be concentric to the overhead-conveyor-section, the latter forming an open loop, and preferably arranged also concentric to the carousel conveyor such that the further horizontal conveying loop is above and beside the horizontal conveying loop of the carousel conveyor. The conveying speeds of the horizontal conveying loop and the further horizontal conveying loop may be synchronized.

In another exemplary aspect, the system may also include a further conveyor for feeding the poultry or parts thereof to the further carousel conveyor. The system may comprise means for controlling the speed of the further endless belt of the further conveyor to control the feeding of poultry to the further carousel conveyor, such as a push button or the like, provided in the first or second conveyor to start/stop the further conveyor. In this way the operator may stop feeding of poultry or parts thereof. The push button may be arranged to be pressed with the hand or with the foot. Another example is the use of photovoltaic cells for detecting when the operator is approaching/moving away relative to the further conveyor to activate/deactivate the further conveyor.

Another exemplary aspect of the invention relates to an apparatus for assisting an operator to hang poultry or parts thereof to an overhead-conveyor-section of an overhead conveyor, wherein the apparatus includes a frame, a first conveyor being supported by the frame and a second conveyor being also supported by the frame. The second conveyor may be a carousel conveyor arranged in the apparatus such that its endless movable element, may include a belt or platform section or sections, and may define a substantially horizontal conveying loop below and beside a first endless movable element of the first conveyor. The first conveyor and the second conveyor may also be arranged such that they convey in the same direction. In this way, the apparatus may replace a first conveyor of the prior art and used to help an operator to hang poultry to an overhead-conveyor-section already present in a slaughterhouse.

In an exemplary embodiment, a vertical distance between the first and second endless movable belts may be within a range between 60 cm and 100 cm.

In another exemplary embodiment, the first conveyor and the second conveyor may be arranged such that the conveying speeds of first endless movable element and the second endless movable element speeds are synchronized.

The first conveyor may be a further carousel conveyor such that from a top view the further carousel conveyor is arranged radially relative to the carousel conveyor such that the at least first endless movable element is arranged for conveying along a further horizontal conveying loop being above the horizontal loop of the carousel conveyor. The loops may have an elliptical or O-shape.

These and other features, aspects and advantages of the present invention will become better understood with reference to the following description and appended claims. The accompanying drawings, which care incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
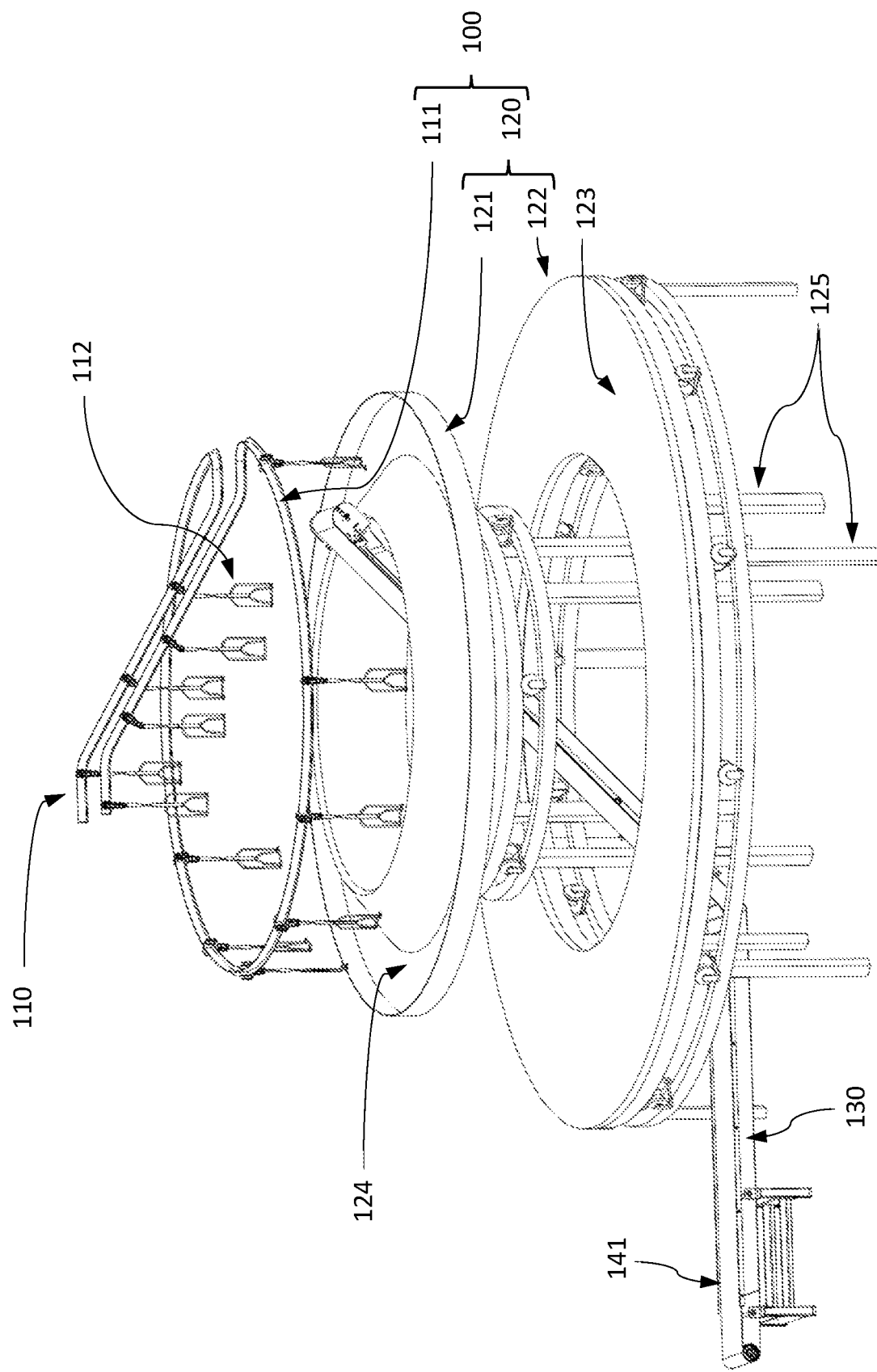
FIG. 1 shows an exemplary system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both").

FIG. 1 depicts an embodiment of a system 100 according to exemplary embodiment of the invention. The system 100 comprises a section 111 of an overhead conveyor 110 and an apparatus 120.

The section 111, referred from now on as the overhead-conveyor-section 111, defines an open loop having substantially a circular shape. The overhead conveyor comprises carriers 112, in the present example shackles, that are conveyed by a chain and a first drive means (not depicted).

The apparatus 120 includes a first conveyor 121 and a second conveyor 122. In the present exemplary embodiment, both conveyors are supported by a frame 125. However, it is important to note that the system 100 may include conveyors supported by independent frames.

The second conveyor 122 is a carousel conveyor 122 including an endless movable element 123, in the present embodiment a platform 123 being driven by a drive means (not shown) to convey along a substantially horizontal loop. The platform 123 has an O-shape and is arranged concentric to the overhead-conveyor-section 111 along a vertical axis.

The first conveyor 121 is a further carousel conveyor 121 also having an endless movable element 124, in the present embodiment a receptable 124 including at the bottom a platform. It is driven also by a further driven means to convey along a further substantially horizontal loop. Further, the platform 123 and the receptacle 124 are synchronized.

As shown in FIG. 1, the platform 123 and the receptacle 124 are concentrically arranged along a vertical axis, the latter being above and beside the platform 123. The vertical distance between them in the vertical is 90 cm.

Finally, the system 100 also has a further conveyor 130 including an endless belt 141 for feeding poultry to the receptacle 124.

Figure 2A:
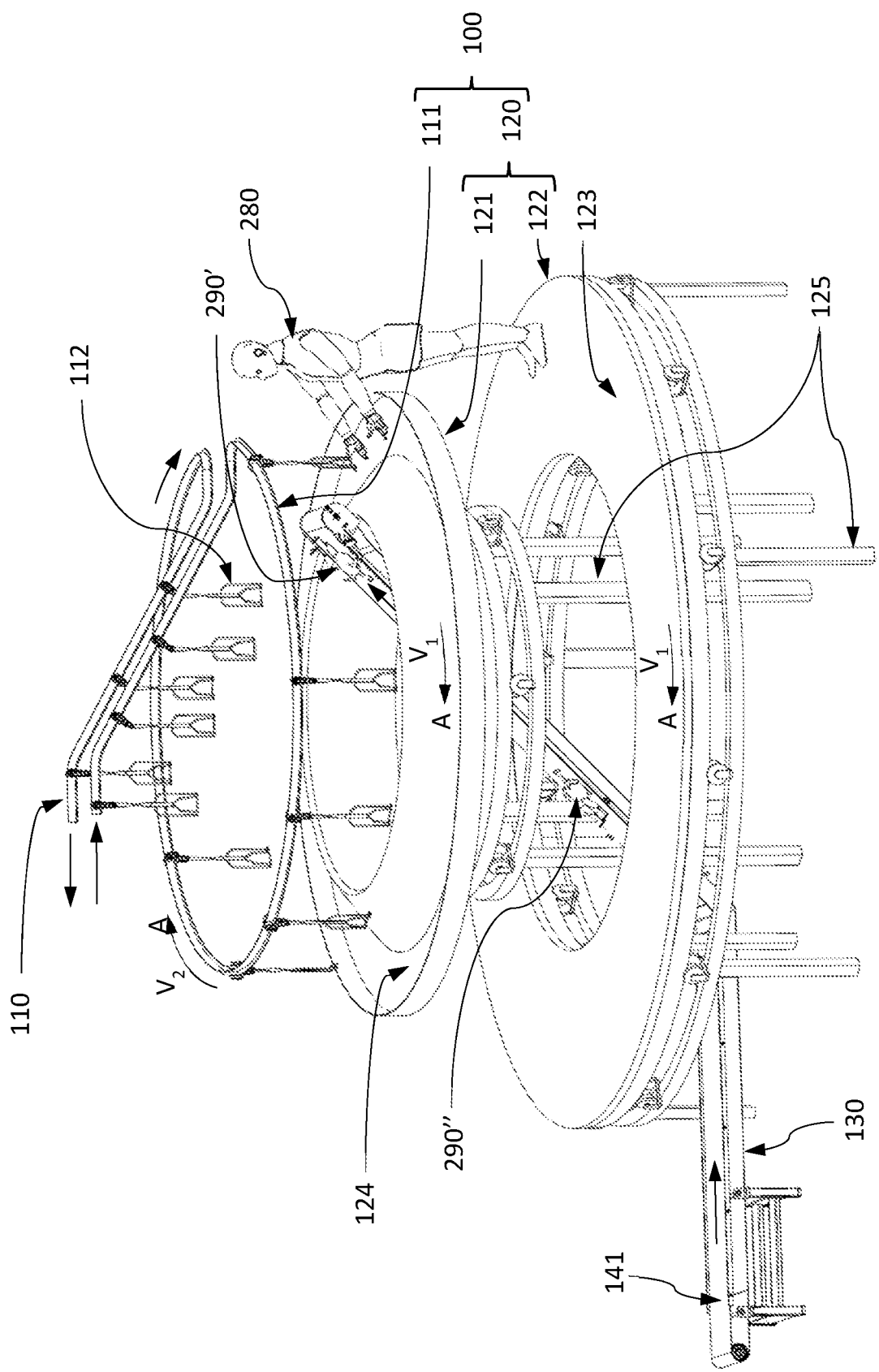
FIG. 2A shows the exemplary system of FIG. 1 with an operator standing in a first position.
Figure 2B:
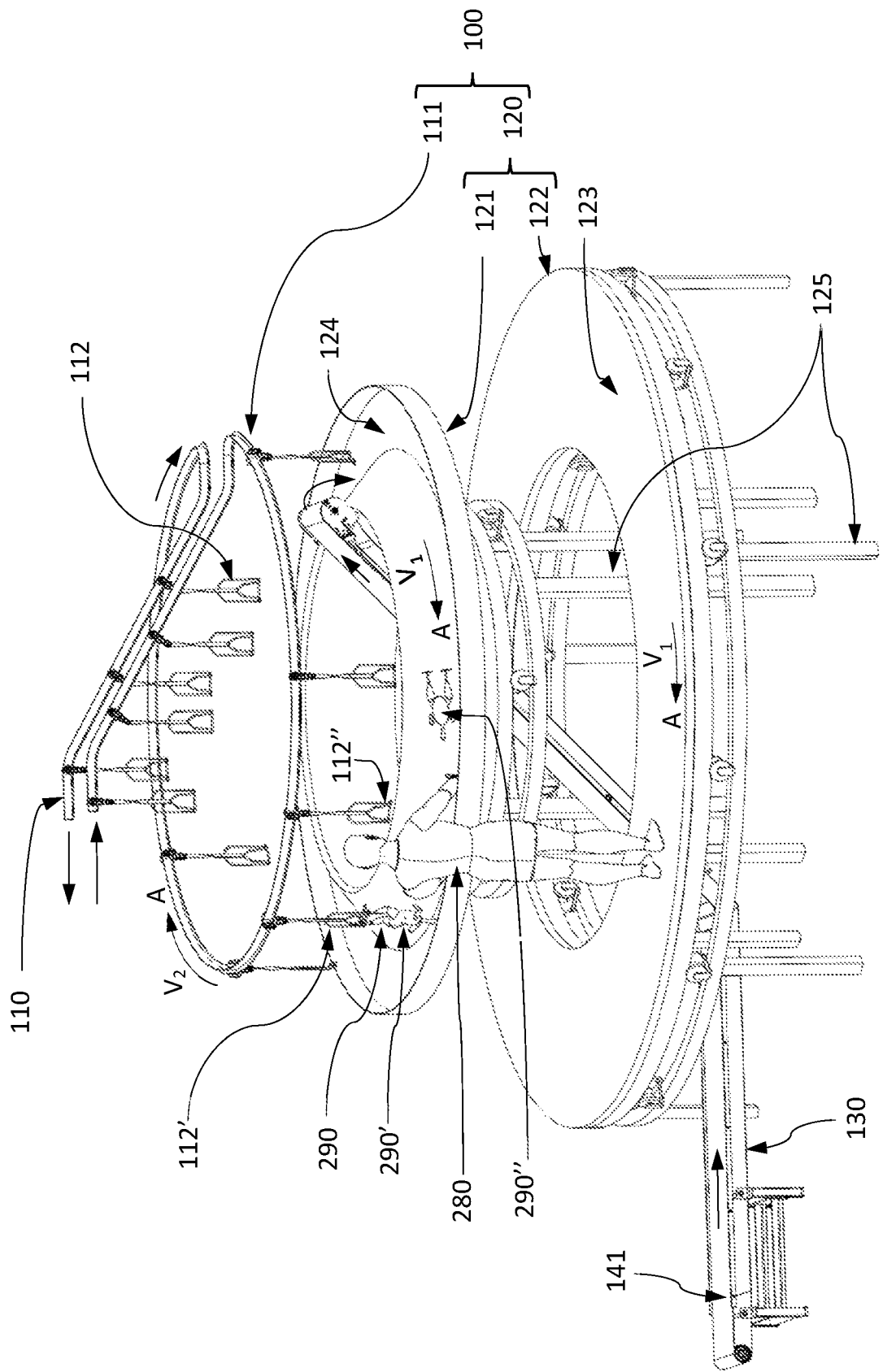
FIG. 2B shows the exemplary system of FIG. 1 with an operator standing in a second position.

FIGS. 2A and 2B depict the system 100 in use. For the sake of clarity, only one operator 280 is represented standing up on top of the platform 123 of the carousel conveyor 122. However, two or more of them may be distributed along the belt.

In FIG. 2A, the operator 280 is standing up in a first position on the platform 123 of the carousel conveyor 122. The platform 123 conveys in the direction A at a conveying speed V1 to carry the operator 280. Thus, after a short period of time, the operator 280 will be standing up in a second position as depicted in FIG. 2B.

Poultry 290 is fed by the further conveyor 130 to the receptacle 124 of the further carousel conveyor 121, the latter being conveyed at the direction A. For the sake of clarity, only a first chicken 290' and a second chicken 290" are depicted.

The operator 280 picks a first chicken 290' from the receptacle 124 (FIG. 2A) and hangs it in carrier 120' being conveyed in the overhead-conveyor-section 111 (FIG. 2B).

The carriers 112 are being conveyed in the overhead-conveyor-section 111 in the same direction A but at a conveying speed V2. In the present embodiment the ratio V1/V2 is 0.8, meaning that the conveying speed of the carriers 112 is higher than the conveying speed of the operator. Thus, the carriers 112 moves forwards relative to the operator 280 being carried on the platform 123. The operator 280 may then pick the second chicken 290" being conveyed on the receptacle 124 and hang it on an empty carrier 112" being available (FIG. 2B) without changing the spot in the platform 123 where he is standing on.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for hanging poultry or parts thereof in an overhead conveyor, the overhead conveyor including an overhead conveyor section and carriers for conveying poultry or parts thereof while being hanged from the carriers, the method comprising:
   using a first conveyor for conveying the poultry or parts thereof towards a section thereof that is below the overhead-conveyor-section;
   picking the poultry or parts thereof from the section; and hanging the poultry or parts thereof in the carriers being conveyed along the overhead-conveyor-section;
   carrying an operator beside the section of the first conveyor and on a second conveyor that is below the first conveyor, the carrying being in the direction of the carriers of the overhead-conveyor-section and while the operating performs the picking and hanging.

2. The method according to claim 1, wherein during the carrying the operator is standing up.

3. The method according to anyone of the claim 1, wherein the overhead-conveyor-section defines an open loop and wherein the second conveyor is a carousel conveyor, and wherein the carrying further comprises that the operator is carried along a horizontal conveying loop below the open loop.

4. The method according to claim 3, wherein a conveying speed of the carrousel conveyor and the carriers in the overhead-conveyor-section are arranged such that the carriers move forward relative to the operator being carried.

5. The method according to claim 4, wherein the first conveyor is a further carousel conveyor and wherein the poultry or parts thereof is conveyed endlessly via the further carousel conveyor along a further horizontal conveying loop arranged above the horizontal conveying loop of the carousel conveyor.

6. A system for helping at least one operator to hang poultry or parts thereof in an overhead conveyor provided with movable carriers for conveying poultry or parts thereof while being hanged from the carriers, the system comprising:
   an overhead-conveyor-section of the overhead conveyor;
   a first conveyor for conveying the poultry or parts thereof towards a section thereof being below the overhead-conveyor-section; and
   a second conveyor being below the first conveyor and arranged for carrying the at least one operator beside the section of the first conveyor and in the direction of the carriers in the overhead-conveyor-section.

7. The system according to claim 6, wherein the second conveyor comprises a belt or platform arranged for carrying the at least one operator while the operator is standing up.

8. The system according to claim 6, wherein the overhead-conveyor-section defines an open horizontal conveying loop and the second conveyor is a carousel conveyor having a belt or platform that defines a horizontal conveying loop under the open horizontal loop.

9. The system according to claim 6, wherein the first conveyor is a further carousel conveyor and further comprising a further endless movable belt or platform defining a further horizontal conveying loop such that the horizontal conveying loop and the further horizontal conveying loop are concentric along a vertical axis.

10. The system according to claim 9, wherein a vertical distance between the conveying loop and the further conveying loop is within a range between 60 and 100 cm.

11. The system according to claim 10 comprising a further conveyor for feeding the poultry or parts thereof to the further carousel conveyor.

12. The system according to claim 11, further comprising means for controlling the speed of the further conveyor to control the amount of poultry or parts thereof to be fed to the further carousel conveyor.

13. An apparatus for assisting at least one operator to hang poultry or parts thereof to an overhead-conveyor-section of an overhead conveyor, the apparatus comprising
   a frame;
   a first conveyor supported by the frame and having a first endless movable element for conveying;
   a carousel conveyor supported by the frame, wherein the carousel conveyor includes a second endless movable element for conveying along a horizontal conveying loop arranged between 60 cm and 100 cm below and beside the first endless movable element, and wherein the first endless movable element and the second endless movable element are arranged such that they convey in the same direction.

14. The apparatus according to claim 13, wherein the first conveyor is a further carousel conveyor, wherein the first endless movable element is arranged for conveying along a further horizontal conveying loop such that the horizontal conveying loop and the further horizontal conveying loop are concentric along a vertical axis.

15. The apparatus according to claim 14, wherein the conveying speeds of the first endless movable element and the second endless movable element are synchronized.

* * * * *